(12) United States Patent
Vyakaranam et al.

(10) Patent No.: US 9,181,428 B2
(45) Date of Patent: Nov. 10, 2015

(54) COMPRESSION SET PROPERTY IN SILYLATED POLYMERS

(71) Applicants: Kamesh R. Vyakaranam, Pearland, TX (US); Ling Zhang, Missouri City, TX (US); Venkat S. Minnikanti, Pearland, TX (US); Dwight Latham, Clute, TX (US); Sara Arshad, West Springfield, MA (US); Rajat Duggal, Pearland, TX (US); William A. Koonce, Pearland, TX (US)

(72) Inventors: Kamesh R. Vyakaranam, Pearland, TX (US); Ling Zhang, Missouri City, TX (US); Venkat S. Minnikanti, Pearland, TX (US); Dwight Latham, Clute, TX (US); Sara Arshad, West Springfield, MA (US); Rajat Duggal, Pearland, TX (US); William A. Koonce, Pearland, TX (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 14/342,652

(22) PCT Filed: Sep. 17, 2012

(86) PCT No.: PCT/US2012/055748
§ 371 (c)(1),
(2) Date: Mar. 4, 2014

(87) PCT Pub. No.: WO2013/048806
PCT Pub. Date: Apr. 4, 2013

(65) Prior Publication Data
US 2014/0228515 A1  Aug. 14, 2014

Related U.S. Application Data

(60) Provisional application No. 61/541,745, filed on Sep. 30, 2011.

(51) Int. Cl.
| | |
|---|---|
| *C08G 77/06* | (2006.01) |
| *C08L 71/00* | (2006.01) |
| *C08G 65/336* | (2006.01) |
| *C08L 101/10* | (2006.01) |
| *C08L 71/02* | (2006.01) |
| *C08L 75/08* | (2006.01) |
| *C08L 75/04* | (2006.01) |
| *C08L 83/00* | (2006.01) |
| *C08L 83/06* | (2006.01) |
| *C08K 5/00* | (2006.01) |

(52) U.S. Cl.
CPC ............... *C08L 71/00* (2013.01); *C08G 65/336* (2013.01); *C08L 71/02* (2013.01); *C08L 101/10* (2013.01); *C08K 5/0025* (2013.01); *C08L 75/04* (2013.01); *C08L 75/08* (2013.01); *C08L 83/00* (2013.01); *C08L 83/06* (2013.01)

(58) Field of Classification Search
CPC ......... C08L 71/02; C08L 75/08; C08L 75/04; C08L 83/00; C08L 83/06; C08L 65/336
See application file for complete search history.

(56) References Cited

U.S. PATENT DOCUMENTS

| | | | |
|---|---|---|---|
| 5,227,434 A | 7/1993 | Katz | |
| 5,840,800 A * | 11/1998 | Joffre et al. | 524/806 |
| 7,834,115 B2 * | 11/2010 | Johansson et al. | 526/279 |
| 2002/0013427 A1 | 1/2002 | Tsuji et al. | |
| 2007/0129528 A1 * | 6/2007 | Huang et al. | 528/78 |
| 2008/0125539 A1 | 5/2008 | Mack | |
| 2009/0124751 A1 * | 5/2009 | Lucas et al. | 524/507 |
| 2009/0247712 A1 | 10/2009 | Tanaka et al. | |
| 2010/0160471 A1 | 6/2010 | Sengupta et al. | |
| 2010/0286308 A1 | 11/2010 | Carlsson | |
| 2011/0038065 A1 | 2/2011 | Miyawaki et al. | |
| 2012/0107626 A1 * | 5/2012 | Schindler et al. | 428/447 |
| 2012/0111498 A1 * | 5/2012 | Verosky et al. | 156/329 |
| 2014/0018467 A1 * | 1/2014 | Durand et al. | 523/122 |

FOREIGN PATENT DOCUMENTS

| | | |
|---|---|---|
| GB | 247447 A | 2/1926 |
| KR | 2011059419 A | 6/2011 |
| WO | 95/17463 A1 | 6/1995 |
| WO | 2011/011371 A2 | 1/2011 |

OTHER PUBLICATIONS

PCT/US2012/055748 International Search Report and Written Opinion, dated Dec. 4, 2012, pp. 1-9.
PCT/US2012/055748, International Preliminary Report on Patentability, dated Dec. 17, 2013, pp. 1-12.

* cited by examiner

*Primary Examiner* — Margaret Moore

(57) ABSTRACT

Moisture curable compositions including silylated polymers and methods for producing the same are provided. A two component moisture curable system for producing a cured or cross-linked silylated polymer having improved compression set properties is provided. The two component system comprises a first formulation and a second formulation. The first formulation comprises a silylated polymer, water, and filler and the second formulation comprises the silylated polymer, a curing catalyst comprising at least one Brønsted acid, and a moisture scavenger. The final cured formulation may have a compression set, determined by ASTM D395 or ISO 815-1, of less than 100%, and in some examples less than 50% and in some examples less than 15%. This demonstrated improvement in compression set not only allows the silylated polymers to be used in applications where cyclic loads are applied but also enhances product durability.

13 Claims, 1 Drawing Sheet

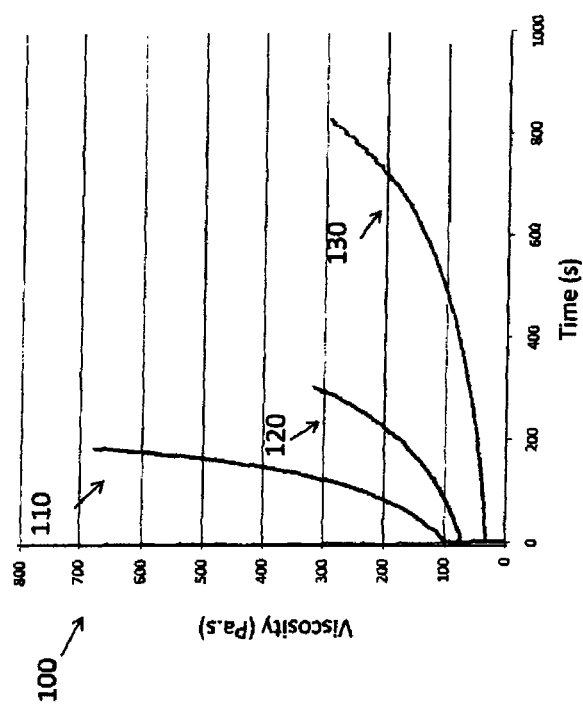

COMPRESSION SET PROPERTY IN SILYLATED POLYMERS

BACKGROUND OF THE INVENTION

1. Field of the Invention

Embodiments of the invention generally relate to moisture curable compositions including silylated polymers and methods for producing the same.

2. Description of the Related Art

Polyurethane (PU) prepolymers have been widely used in adhesive and sealant applications owing to their superior performances and relatively low cost. In recent decades, however, isocyanate-containing polyurethane prepolymers have faced increasing environmental regulation due to the presence of free isocyanates. As a result, for many applications, conventional polyurethane prepolymers have now been replaced with isocyanate-free alternatives, for example, silylated polymers.

Silylated polymers or crosslinkable silane-terminated polymers (STPs) are widely used as raw material polymers in coating materials, adhesives, sealing materials, elastomers and the like (CASE applications) for architectural or industrial use. Silylated polymers typically comprise polyether polyols and reactive alkoxysilane end groups. Depending on end-use applications, the mechanical property requirements of a cured silylated polymer varies significantly.

Although silylated polymers offer many advantages over polyurethane prepolymers, opportunities for improvement exist. One such opportunity involves the reduction of compression set in cross-linked or cured silylated polymers. Compression set is a measure of the deformation of a polymer after it has been exposed to compressive stress under controlled time and temperature conditions. Compared to cross-linked or cured polymers made from polyurethane prepolymers cross-linked or cured polymers made from silylated polymers were found to have high compression set, which prevents the products from being used under cyclic/dynamic loads, such as gaskets and sealing rings. For parts made from silylated polymers used in applications exposed to long term continuous load or infrequent load/unload cycles, product durability is of concern.

Therefore, there is a need for cross-linked or cured silylated polymers and compositions having cross-linked or cured silylated polymers exhibiting improved compression set properties.

SUMMARY OF THE INVENTION

Embodiments of the invention relate to moisture curable compositions including silylated polymers and methods for producing the same. In one embodiment, a two component moisture curable system providing a silylated product where the cured product has improved compression set properties is provided. The two component system comprises a first formulation and a second formulation. The first formulation comprises a silylated polymer, water, and filler and the second formulation comprises the silylated polymer, a curing catalyst comprising at least one Brønsted acid, and a moisture scavenger. Additional components in the formulation may also include additives such as rheology modifiers, adhesion promoters, and others.

BRIEF DESCRIPTION OF THE DRAWINGS

So that the manner in which the above-recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 1 is a plot depicting the increase in viscosity of silylated polymers with curing as a function of catalyst loading.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Embodiments of the invention generally relate to moisture curable compositions including silylated polymers and methods for producing the same. The compositions are mixtures of silylated polymers having an effective amount of unreacted alkoxy silane groups prior to cure. In the presence of moisture and at least one Brønsted acid catalyst, the silylated polymers cross-link or cure to provide silylated products having improved compression set.

Embodiments described herein provide a formulation capable of producing cross-linked or cured silylated polymers exhibiting low compression set. The aforementioned formulation may contain a curing catalyst that includes at least one Brønsted acid, which by definition is any compound capable of donating proton(s). Such catalysts may include, for example, sulfonic acids, such as dodecylbenzyl sulfonic acid (DDBSA), dinonylnaphthalene disulfonic acid (DNNSA); carboxylic acids, such as benzoic acid, formic acid; and phosphoric acid. The aforementioned formulation may also contain water, that has a stoichiometrical ratio to curable silane of less than or equal to 2.0, preferably less than or equal to 1.5, most preferably less than or equal to 1.0. As demonstrated herein, the final cured formulation may have a compression set, determined by either ASTM D395 or ISO 815-1, of less than 100%, and in some examples less than 50% and in some of the examples less than 15%. The demonstrated improvement in compression set not only allows the cured or cross-linked silylated polymers to be used in applications where cyclic loads and/or continuous loads are applied but also enhances product durability.

As used herein, the term "Brønsted acid" refers to an acid or combination of acids which is a molecule or ion that is able to lose, or "donate" a hydrogen cation (proton, $H^+$).

As used herein, the term "Compression Set" refers to the results of testing used to determine the ability of elastomeric materials to maintain elastic properties after prolonged compressive deformation. The test measures the somewhat permanent deformation of a sample after the sample has been exposed to compressive deformation for a set time period. Compression set is determined according to the procedures of either ASTM D395 or ISO 815-1.

As used herein, the term "Lewis acid" refers to any molecule or ion (called an electrophile) that can combine with another molecule or ion by forming a covalent bond with two electrons from the second molecule or ion. A Lewis acid is thus an electron acceptor.

The moisture curable compositions including silylated polymers described herein are typically formulated as 2-component systems where the A-side may include silylated polymer resins, fillers, water, adhesion promoters and rheology modifiers and the B-side may include the silylated polymer resins, fillers, moisture scavengers and the Brønsted acid curing catalyst. The A-side mixture containing the silylated polymer and water remains stable until combined with the B-side mixture which contains the Brønsted acid catalyst.

The silylated polymer described herein may be at least one of: (i) silylated polymer obtained from the reaction of a polyol with an isocyanatosilane, (ii) silylated polymer obtained from the reaction of a hydroxyl terminated polyurethane prepolymer with isocyanatosilane, (iii) silylated polymer obtained from the reaction of isocyanto-terminated polyurethane prepolymer with hydrogen active organofunctional silane that can react with isocyanate; (iv) silylated polymer obtained from reaction of unsaturated carbon-carbon-terminated polyoxyalkylenepolymer with a compound having a hydrogen-silicon bond to obtain silane terminated polymer; and (v) a silylated polymer obtained from reaction of unsaturated carbon-carbon-terminated polyalkylene polymer with a compound having a hydrogen-silicon bond to obtain silane terminated polymer.

The silylated polymers described herein may be prepared with organic molecules having a plurality of hydroxyl groups including, for example, polyether polyols, polyester polyols, polyetherester polyols, polyolefin polyols, polycarbonate, polyestercarbonates, polyethercarbonates, polycaprolactone, and copolymer polyols.

Hydrosilylation:

In certain embodiments described herein, the silylated polymer may be obtained by the hydrosilylation of a polymer having at least one unsaturated group and at least one alcoholic hydroxyl group in each molecule. The hydrosilylated polymer may then be capped by exposing the hydrosilylated polymer to at least one isocyanate to form a composition including isocyanate capped hydrosilylated polymers. The isocyanate capped hydrosilylated polymers may then be reacted with a polyol to form the silylated polymer.

The polymer having at least one unsaturated group and at least one alcoholic hydroxyl group is not particularly restricted, and may include any polymer as long as they include at least one unsaturated group (such as a carbon-carbon double bond or carbon-carbon triple bond) and at least one alcoholic hydroxyl group.

The polymer having at least one unsaturated group and at least one alcoholic hydroxyl group may have a molecular weight from 40 to 20,000 g/mol, more preferably from 200 to 10,000 g/mol, and most preferably from 800 to 2,000 g/mol.

The polymer having at least one unsaturated group and at least one alcoholic hydroxyl group in each molecule may have a number average molecular weight of between about 100 and about 5,000. All individual values and sub-ranges from 100 to 5,000 are included herein and disclosed herein; for example, the number average molecular weight can be from a lower limit of 100, 200, 300, 400, 500, 600, 700, 800, 900, 1,000, 1,250, 1,500, or 1,750 to, independently, an upper limit of 1,000, 1,250, 1,500, 1,750, 2,000, 2,500, 3,000, 3,500, 4,000, 4,500, or 5,000.

In one embodiment, the polymer having at least one unsaturated group and at least one alcoholic hydroxyl group in each molecule may be a polyoxyalkylene polymer as described in co-pending PCT Patent Application No. PCT/US11/038,065, entitled "Methods for Producing Crosslinkable Silyl Group-Containing Polyoxyalkylene Polymers," which is hereby incorporated by reference in its entirety.

In one embodiment, the polymer having at least one unsaturated group and at least one alcoholic hydroxyl group in each molecule may be made by subjecting an epoxy compound to ring opening polymerization using an unsaturated group- and active hydrogen-containing compound as a polymerization initiator in presence of a catalyst. Catalysis for this polymerization can be either anionic or cationic, with catalysts such as KOH, CsOH, boron trifluoride, or a double cyanide complex (DMC) catalyst such as zinc hexacyanocobaltate or quaternary phosphazenium compound. The active hydrogen-containing compound that may be used as a polymerization initiator is not restricted but may be any of those compounds which are applicable in association with double metal cyanide complexes, such as, for example, compounds including an alcoholic hydroxyl, phenolic hydroxyl or carboxyl group.

The polymer having at least one unsaturated group and at least one alcoholic hydroxyl group may include allyl alcohol, methallyl alcohol, trimethylolpropane monoallyl ether, trimethylolpropane diallyl ether, glycerol monoallyl ether, glycerol diallyl ether, ethylene oxide adducts or propylene oxide adducts thereof and like compounds containing at least one unsaturated group and at least one alcoholic hydroxyl group in each molecule, hydroxyl-terminated hydrocarbon compounds such as hydroxyl-terminated polybutadiene, and the like. Such active hydrogen-containing compounds serving as polymerization initiators may be used singly or a plurality thereof may be used in combination.

The monoepoxide which may be used in the ring opening polymerization may include, among others, monoepoxides having no unsaturated group such as ethylene oxide, propylene oxide, butene oxide, isobutene oxide, epichlorohydrin and styrene oxide; and unsaturated group-containing monoepoxides such as allyl glycidyl ether, methallyl glycidyl ether, glycidyl acrylate, glycidyl methacrylate, butadiene monoxide and cyclopentadiene monoxide. These may be used singly or a plurality thereof may be used in combination.

In one embodiment, the polymer having at least one unsaturated group and at least one alcoholic hydroxyl group in each molecule may be a propylene glycol monoallyl ether having a number average molecular weight between about 600 and about 1,000, and an OH number of between about 50 and about 90.

The polymer having at least one unsaturated group and at least one alcoholic hydroxyl group in each molecule may be hydrosilylated by reacting the polymer with a compound having a hydrogen-silicon bond and a crosslinkable silyl group in the presence of a hydrosilylation catalyst.

The compound having a hydrogen-silicon bond and a crosslinkable silyl group in each molecule, may be represented by the general formula (I) shown below:

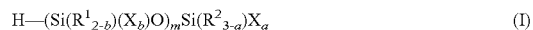

$$H-(Si(R^1_{2-b})(X_b)O)_m Si(R^2_{3-a})X_a \qquad (I)$$

where $R^1$ and $R^2$ are the same or different and each represents an alkyl group containing 1 to 20 carbon atoms, an aryl group containing 6 to 20 carbon atoms, an aralkyl group containing 7 to 20 carbon atoms, or a triorganosiloxy group represented by $R^3_3SiO$— and, when there are a plurality of $R^1$ or $R^2$ groups, they may be the same or different; $R^3$ is a univalent hydrocarbon group containing 1 to 20 carbon atoms and the three $R^3$ groups may be the same or different with one another; X represents a hydroxyl group or a hydrolyzable group and, when there are two or more X groups, they may be the same or different with each other or one another; a represents 0, 1, 2 or 3 and b represents 0, 1 or 2; b's in the m of —Si $R^1_{2-b})(X_b)$O-groups may be the same or different with each other or one another; and m represents an integer from 0 to 19 provided that the relation $a+\Sigma b \geq 1$ should be satisfied.

The hydrolyzable group represented by X may be any of those hydrolyzable groups known in the art, for example halogen atoms and alkoxy, acyloxy, ketoximato, amino, amido, acid amide, aminoxy, mercapto and alkenyloxy groups. Among them, alkoxy groups such as methoxy, ethoxy, propoxy and isopropoxy are preferred in view of their mild hydrolyzability and the ease of handling. One to three such hydrolyzable groups may be bonded to one silicon atom and the sum (a+Σb) is preferably 1 to 5. When there are two or more hydrolyzable groups, they may be the same or different with each other or one another. The number of silicon atoms in the crosslinkable silyl group may be about 1 to 30.

In some embodiments, the compound having a hydrogen-silicon bond and a crosslinkable silyl group in each molecule represented by the above general formula (II) may include the compounds represented by the general formula (II):

$$H\text{—}Si(R^4{}_{3-c})(X_c) \quad\quad (II)$$

wherein $R^4$ represents an alkyl containing 1 to 20 carbon atoms, an aryl group containing 6 to 20 carbon atoms or an aralkyl group containing 7 to 20 carbon atoms or a triorganosiloxy group represented by $R^3{}_3SiO$— and, when there are a plurality of $R^4$ groups, they may be the same or different; $R^3$ is a univalent hydrocarbon group containing 1 to 20 carbon atoms and the three $R^3$ groups may be the same or different with one another; X represents a hydroxyl group or a hydrolyzable group and, when there are two or more X groups, they may be the same or different with each other or one another; and c represents 1, 2 or 3.

As specific examples of the compound having a hydrogen-silicon bond and a crosslinkable silyl group in each molecule, there may be mentioned halosilanes such as trichlorosilane, methyldichlorosilane, dimethylchlorosilane, phenyldichlorosilane, trimethylsiloxymethylchlorosilane and 1,1,3,3-tetramethyl-1-bromodisiloxane; alkoxysilanes such as trimethoxysilane, triethoxysilane, methyldiethoxysilane, methyldimethoxysilane, phenyldimethoxysilane, trimethylsiloxymethylmethoxysilane and trimethylsiloxydiethoxysilane; acyloxysilanes such as methyldiacetoxysilane, phenyldiacetoxysilane, triacetoxysilane, trimethylsiloxymethylacetoxysilane and trimethylsiloxydiacetoxysilane; ketoximatosilanes such as bis(dimethyl ketoximato)methylsilane, bis(cyclohexyl ketoximato)methylsilane, bis(diethyl ketoximato)trimethylsiloxysilane, bis (methyl ethyl ketoximato)methylsilane and tris(acetoximato) silane; alkenyloxysilanes such as methylisopropenyloxysilane; functional silanes such as isocyanatosilane; and the like. Preferred among them from the mild reactivity and ease of handling viewpoint are alkoxysilanes such as methyldimethoxysilane, trimethoxysilane, methyldiethoxysilane and triethoxysilane; and halosilanes such as trichlorosilane and methyldichlorosilane.

After the reaction with an unsaturated group in the manner of hydrosilylation, the halogen atom(s) in the halosilanes may be converted to some other hydrolyzable group(s) by reacting with an active hydrogen-containing compound such as a carboxylic acid, oxime, amide or hydroxylamine or a ketone-derived alkali metal enolate by an appropriate method known in the art.

The hydrosilylation catalyst may be any of those metal complexes the metal of which is selected from among the group VIII transition metals such as platinum, rhodium, cobalt, palladium and nickel. From the hydrosilylation reactivity viewpoint, $H_2PtCl_6 \cdot 6H_2O$, platinum-divinylsiloxane complexes, platinum-olefin complexes, Pt metal, RhCl(PPh$_3$)$_3$, RhCl$_3$, Rh/Al$_2$O$_3$, RuCl$_3$, IrCl$_3$, FeCl$_3$, AlCl$_3$, PdCl$_2 \cdot 2H_2$O, NiCl$_2$, TiCl$_4$ and the like are preferred, $H_2PtCl_6 \cdot 6H_2O$, platinum-vinylsiloxane complexes and platinum-olefin complexes are more preferred and platinum-vinylsiloxane complexes and platinum-olefin complexes are particularly preferred. The platinum-vinylsiloxane complexes collectively refer to compounds resulting from coordination of an intramolecular vinyl-containing siloxane, polysiloxane or cyclic siloxane, as a ligand, to a platinum atom. As typical examples of the ligand, there may be mentioned 1,1,3,3-tetramethyl-1,3-divinylsiloxane and the like. As specific examples of the olefin ligand in the platinum-olefin complex, there may be mentioned 1,5-hexadiene, 1,7-octadiene, 1,9-decadiene, 1,11-dodecadiene and 1,5-cyclooctadiene. Among the ligands specifically mentioned above, 1,1,3,3-tetramethyl-1,3-divinylsiloxane and 1,9-decadiene are preferred from the hydrosilylation reactivity viewpoint. The hydrosilylation catalyst to be used in the practice of the invention may be used singly or a combination of a plurality of species may be used.

The amount of the hydrosilylation catalyst to be used is not particularly restricted but generally is 0.00001 to 1 part by weight, preferably 0.00005 to 0.05 part by weight, more preferably 0.0001 to 0.01 part by weight, based on the weight of the metal in the catalyst, per 100 parts by weight of the polyoxyalkylene polymer having at least one unsaturated group and at least one alcoholic hydroxyl group in each molecule. When the amount is less than 0.00001 parts by weight, any sufficient reaction activity may not be obtained in some instances and an amount exceeding 1 part by weight may be economically disadvantageous or cause discoloration of the polymer in certain instances.

In the above reaction, the use of a solvent is essentially unnecessary. For uniformly dissolving the catalyst and/or substrate, for controlling the reaction system temperature and/or for facilitating the addition of the substrate and/or catalyst components, however, a solvent can be used. Solvents suited for these purposes include, but are not limited to, hydrocarbon compounds such as hexane, cyclohexane, ethylcyclohexane, heptane, octane, dodecane, benzene, toluene, xylene and dodecylbenzene; halogenated hydrocarbon compounds such as chloroform, methylene chloride, chlorobenzene and o-dichlorobenzene; and ethers such as ethyl ether, tetrahydrofuran and ethylene glycoldimethyl ether, among others. Those plasticizers which can be used as plasticizers for the polyoxyalkylene polymer, such as phthalate esters and polyethers, can also be used as the reaction solvents. These may be used singly or a plurality of them may be used in combination.

The hydrosilylation reaction temperature is not particularly restricted but may for example be within the range of 0° C. to 150° C., or within the range of 20° C. to 100° C. At below 0° C., the rate of reaction may be low in some instances and, at above 150° C., side reactions involving the hydroxyl group, hydrogen-silicon bond and/or crosslinkable silyl group may proceed in certain instances. In one embodiment, the hydrosilylation reaction temperature is about 60° C.

In embodiments of the invention the polymers having at least one unsaturated group and at least one alcoholic hydroxyl group in each molecule are hydrosilylated with a hydrosilylation efficiency of at least about 70%, such as between about 70% and about 100%. All individual values and subranges from about 70 to about 100 are included herein and disclosed herein; for example, the hydrosilylation efficiency can be from a lower limit of about 70, 75, 80, 90, or 92%, to, independently, an upper limit of about 80, 85, 90, 92, 94, 95, 96, 98, 99, or 100%. This includes polymers hydrosilylated with a hydrosilylation efficiency of 80 to 95% and further includes hydrosilylated polymers capped with a hydrosilylation efficiency of 85 to 95%. As used herein, the "hydrosilylation efficiency"=[100×((number of unsaturation groups on the polyol hydrosilylated)/(total number of unsaturation groups on the polyol that were initially available for hydrosilylation))], and may be measured using $^1$H-NMR.

The hydrosilylated polymers having at least one crosslinkable silyl group and at least one hydroxyl group in each molecule (hereinafter referred to as "hydrosilylated polymer") as produced by the above described process can react with water or atmospheric moisture to give crosslinked cured products and therefore is useful as a raw material or raw material intermediate for sealing, adhesive, coating and like materials or compositions for architectural or industrial use. However, the high remaining hydroxyl group percentage of this polymer having at least one crosslinkable silyl group and at least one hydroxyl may be capped with a polyisocyanate compound.

Capping:

Among the capping agents usable in the practice of the embodiments of the invention, the polyisocyanate compounds, namely compounds having two or more isocyanate groups in each molecule, include, but are not limited to, aliphatic, cycloaliphatic, arylaliphatic and aromatic isocyanates.

Examples of suitable aromatic isocyanates include the 4,4'-, 2,4' and 2,2'-isomers of diphenylmethane diisocyante (MDI), blends thereof and polymeric and monomeric MDI blends, toluene-2,4- and 2,6-diisocyanates (TDI), m- and p-phenylenediisocyanate, chlorophenylene-2,4-diisocyanate, diphenylene-4,4'-diisocyanate, 4,4'-diisocyanate-3,3'-dimethyldiphenyl, 3-methyldiphenyl-methane-4,4'-diisocyanate and diphenyletherdiisocyanate and 2,4,6-triisocyanatotoluene and 2,4,4'-triisocyanatodiphenylether.

Mixtures of isocyanates may be used, such as the commercially available mixtures of 2,4- and 2,6-isomers of toluene diisocyanates. A crude polyisocyanate may also be used in the practice of the embodiments of the invention, such as crude toluene diisocyanate obtained by the phosgenation of a mixture of toluene diamine or the crude diphenylmethane diisocyanate obtained by the phosgenation of crude methylene diphenylamine. TDI/MDI blends may also be used.

Examples of aliphatic polyisocyanates include ethylene diisocyanate, 1,6-hexamethylene diisocyanate, isophorone diisocyanate, cyclohexane 1,4-diisocyanate, 4,4'-dicyclohexylmethane diisocyanate, 1,3-bis(isocyanatomethyl)cyclohexane, 1,4-bis(isocyanatomethyl)cyclohexane, isophorone diisocyanate (IPDI), saturated analogues of the above mentioned aromatic isocyanates, and mixtures thereof.

The functionality of the isocyanate is preferably greater than 1.0, more preferably greater than 1.5 and most preferably greater than or equal to 2.

Suitable TDI products are available from the Dow Chemical Company under the trade name VORANATE®. Suitable commercially available products of that type include VORANATE® T-80 which is also available from The Dow Chemical Company. Suitable MDI products are available from The Dow Chemical Company under the trade names PAPI®, VORANATE® and ISONATE®.

The isocyanate may have a functionality of at least greater than 1.0, preferably greater than 1.2, and more preferably greater than 1.8.

The capping reaction may be performed at an isocyanate index of between about 100 and about 250. All individual values and sub-ranges from 100 to 250 are included herein and disclosed herein; for example, the isocyanate index can be from a lower limit of 100, 105, 110, 125, 140, 150, 160, 170, 175, 180, 190, 200, 225, to, independently, an upper limit of 150, 175, 200, 225, or 250. In some embodiments the index may be between about 160 and about 200, between about 140 and about 170, or between about 150 and about 180.

When, in the practice of the embodiments of the invention, the hydrosilylated polymer is reacted with a coupling agent such as a compound having two or more isocyanate groups in each molecule, it is not always necessary to use a catalyst. In certain embodiments, it may be preferable to perform the capping reaction without a catalyst (e.g., catalyst-free). It has been found that performing the capping reaction without a catalyst leads to a reduction of by-products (e.g., aliphanates and isocyanurates) in the capped material. For increasing the rate of reaction or improving the degree of conversion, however, a catalyst may be used. The catalyst to be used in carrying out the coupling reaction using a polyisocyanate compound includes, but is not limited to, those catalysts mentioned in Polyurethanes: Chemistry and Technology, Part I, Table 30, Chapter 4, Saunders and Frisch, Interscience Publishers, New York, 1963, for instance.

Preferred as the urethane formation reaction catalysts usable in effecting the coupling reaction using a polyisocyanate compound because of their high activity are tin catalysts such as stannous octylate, stannous stearate, dibutyltin dioctoate, dibutyltin dioleylmaleate, dibutyltin dibutylmaleate, dibutyltin dilaurate, 1,1,3,3-tetrabutyl-1,3-dilauryloxycarbonyldistannoxane, dibutyltin diacetate, dibutyltin diacetylacetonate, dibutyltin bis(o-phenylphenoxide), dibutyltin oxide, dibutyltin bis(triethoxysilicate), dibutyltin distearate, dibutyltin bis(isononyl 3-mercaptopropionate), dibutyltinbis (isooctyl thioglycolate), dioctyltin oxide, dioctyltin dilaurate, dioctyltin diacetate and dioctyltin diversatate. Further, it is preferable to use catalysts low in activity against crosslinkable silyl groups and, thus, for example, sulfur atom-containing tin catalysts such as dibutyltin bis(isononyl 3-mercaptopropionate) and dibutyltin bis(isooctyl thioglycolate) are particularly preferred.

Coupling

The isocyanate capped polymers may be coupled with a polyol to form the final silylated polymer. Polyols suitable for use with the invention described herein are well known and are widely used on a commercial scale. Suitable polyols for coupling with the isocyanate capped polymers include organic molecules having a plurality of hydroxyl groups. High molecular weight polyols, low molecular weight polyols and combinations thereof may be used with the embodiments described herein.

Exemplary high molecular weight polyols include but are not limited to polyester polyols, polyether polyols, polyhydroxy polycarbonates, polyhydroxy polyacetyls, polyhydroxy polyacrylates, polyhydroxy polyester amides and polyhyroxy polythioethers, polyolefin polyols, and combinations thereof. Exemplary polyether polyols include polyols derived from ethylene oxide, propylene oxide, butylene oxide, tetramethylene oxide, or combinations thereof, such as a polypropylene oxide polyol end-capped with ethylene oxide. Any polyol regardless of the molecular weight may be used. The molecular weight of the polyether polyol is preferably in a range of 1,000 to 10,000 g/mol, more preferably in a range of 2,000 to 8,000 g/mol and most preferably in a range of 2,000 to 6,000 g/mol. The functionality of the polyol is preferably in a range of 1.1 to 8, more preferably in a range of 1.5 to 6, and most preferably in a range of 2 to 4. The polyol may also be a blend of two or more polyols.

Exemplary low molecular weight polyols, include but are not limited to, alcohols such as glycol, triethylene glycol, propylene glycol, butanediol, hexylene glycol, trimethylol propane, 1,2,6-hexanetriol, 1,2,4-butanetriol, dieethylene glycol, dipropylene glycol, mannide, trimethylol ethane, pentaerythritol, mannitol, sorbitol, sucrose or/and alkylol amines such as diethanolamine, triethanolamine, and the like, and mixtures thereof.

Exemplary polyols are available from the Dow Chemical Company under the tradename SPECFLEX™ polyols and VORANOL™ polyols. Other exemplary polyolys are available from Bayer MaterialScience under the tradename ACCLAIM® polyols. Commercial examples of such polyols are SPECFLEX® 661 polyol, VORANOL™ CP6001 Polyol, and ACCLAIM® 6300 polyol.

Other exemplary silylated polyols that may be used with the embodiments described herein include MS® S303H Polymer commercially available from KANEKA Texas Corporation and SPUR⁺ 1015LM Prepolymer which is commercially available from Momentive Performance Chemicals.

The Brønsted acid catalyst used with the embodiments described herein may include any acid which is a molecule or ion that is able to lose, or "donate" a hydrogen cation (proton, $H^+$). In certain embodiments, the Brønsted acid catalyst may have a pKa of 2 or less. In certain embodiments, the Brønsted acid catalyst may have a pKa of 1 or less. Exemplary Brønsted acid catalysts include sulfonic acids, carboxylic acid, and phosphoric acid. Exemplary sulfonic acids include dodecylbnzylsulfonic acid and dinonylnapthalene disulfonic acid. Exemplary carboxylic acids include benzoic acid and formic acid. Exemplary acid catalysts are available from King Industries Specialty Chemicals under the tradename NACURE® Acid Catalyst. Commercial examples of such acid catalysts include NACURE® 155 Acid Catalyst and NACURE® 1051 Acid Catalyst.

In certain embodiments, the moisture curable composition has a stoichiometric ratio of water to curable silane equal to 2.0 or less. In certain embodiments, the moisture curable composition has a stoichiometric ratio of water to curable silane equal to 1.5 or less. In certain embodiments, the moisture curable composition has a stoichiometric ratio of water to curable silane equal to 1.0 or less.

The moisture curable composition may further comprise one or more optional additives in either the A-side, the B-side, or both the A-side and B-side. The optional additives may include fillers, moisture scavengers, rheology modifiers, coupling agents, pigments, dyes, plasticizers, thickeners, extenders, and UV stabilizers. Any suitable filler may be used. Suitable fillers may be selected from the group comprising kaolin, montmorillonite, calcium carbonate, mica, wollastonite, talc, high-melting thermoplastics, glass, fly ash, carbon black, titanium dioxide, iron oxide, chromium oxide, azo/diazo dyes, phthalocyanines, dioxazines, and combinations thereof. Other suitable cost lowering and rheology-controlling fillers can be used.

EXAMPLES

Objects and advantages of the embodiments described herein are further illustrated by the following examples. The particular materials and amounts thereof, as well as other conditions and details, recited in these examples should not be used to limit the embodiments described herein.

A description of the raw materials used in the examples is as follows:

| | |
|---|---|
| ACCLAIM ® 6300 Polyol | A triol based on propylene oxide with a molecular weight of about 6,000 and a hydroxyl number between 26.5 and 29.5 mg KOH/g, available from Bayer MaterialScience. |
| Allyl Monol | A propylene glycol monoallyl ether having an allylic content of 3.5 wt % (0.998 mol of unsat/mol monol), a number average molecular weight of about 800, and an OH number of 70 or 2.1 wt % OH, available from The Dow Chemical Company under the tradename UCON ™ Hydrolube APPG 800. |
| CAB-O-SIL ® TS-720 Fumed Silica | A treated fumed silica rheology modifier, commercially available from Cabot Corporation. |
| DBTA | Dibutyltin bis(acetylacetonate), available from SIGMA-ALDRICH ®. |
| DDBSA | Dodecyl benzene sulfonic acid commercially available from SIGMA-ALDRICH ®. |
| DINP | Diisononyl phthalate commercially available from J-ester. |
| DOW CORNING ® Z-6040 Silane | A glycidoxypropyltrimethoxysilane coupling agent for thermoset resins with glass or mineral fillers commercially available from DOW CORNING ®. |
| ImerSeal ™ 75 Calcium Carbonate | An ultra fine marble based calcium carbonate with engineered particle size distribution and controlled moisture commercially available from IMERYS Performance Materials. |
| Karstedt's catalyst | Platinum-divinyltetramethyldisiloxane and xylene as carrier solvent, the Pt loading in the catalyst is 2 wt %, available from Gelest, Inc. |
| Methyldimethoxysilane | Available from Gelest, Inc. |
| MS ® S303H Polymer | A silyl-terminated polyether (STPE) containing a polyether backbone and methoxysilyl chain ends commercially available from KANEKA Texas Corporation. |
| DABCO ® T-12 Catalyst | Dibutyltindilaurate catalyst used for urethane formation reaction commercially available from SIGMA-ALDRICH ®. |
| NACURE ® 155 Acid Catalyst | A hydrophobic sulfonic acid catalyst based on dinonylnapthalene disulfonic acid supplied as a 55% concentrate in isobutanol available from King Industries Specialty Chemicals. |

| | |
|---|---|
| NACURE ® 1051 Acid Catalyst | A hydrophobic sulfonic acid catalyst based on dinonylnaphthalene sulfonic acid supplied at 50% active in 2-Butoyethanol commercially available from King Industries Specialty Chemicals. |
| SILQUEST ™ A-171 Silane | A hydrolyzing alkoxy silane used as a moisture scavenger in moisture cure systems commercially available from Momentive Performance Chemicals. |
| SPECFLEX ™ NC 661 | A grafted polyether triol polyol containing copolymerized styrene and acrylonitrile available from the Dow Chemical Company. |
| SPUR+ 1015LM Prepolymer | A silylated polyurethane resin for manufacturing one-part, moisture-curing sealants and adhesives commercially available from Momentive Performance Chemicals. |
| VORANATE ® T-80 Isocyanate | A toluene diisocyanate (80% 2,4-toluene diisocyanate and 20% 2,6-toluene diisocyanate by weight) composition, available from The Dow Chemical Company. |
| VORANOL ™ CP6001 Polyol | A triol polyether polyol, capped, with a molecular weight of about 6,000 and a hydroxyl number between 26.0 and 29.0 mg KOH/g, available from The Dow Chemical Company. |

Synthesis of SMP-1:

Hydrosilylation:

A hydrosilylation reaction was performed by charging propylene glycol monoallyl ether (54.2 lb, 24.6 kg; 800 MW, hydroxyl content of 2.18%, allyl content of 3.08%) into a 4-necked 250 mL pre-dried glass reactor equipped with a mechanical stirrer. Karstedt's catalyst (Approximately 0.0054 lb, 0.0024 kg) was then added to the reactor and mixed for 2 minutes under a continuous nitrogen purge. Methyldimethoxysilane (6.65 lb, 3.02 kg, 106 MW) was added last and mixed for 40 minutes before the entire reactor was heated to 60° C. for 1 hour. The hydrosilylation product (hereinafter referred to as Hydrosilylated Polyether) was analyzed using $^1$H-showing a hydrosilylation efficiency of >95%.

Prepolymer Synthesis (NCO Capping):

The Hydrosilylated Polyether (46.74 lb, 21.2 kg) was then reacted with excess VORANATE™ T-80 (7.72 lb, 3.50 kg), 1.7 to 1, NCO to OH ratio, at 85° C. and at 150 rpm mixing speed for approximately 8 hours to produce an isocyanate-terminated prepolymer intermediate.

Coupling:

The NCO-capped prepolymers obtained above were exposed to a coupling reaction, in which the NCO-capped prepolymers were reacted with a polypropylene oxide polymer of approximately 6,000 molecular weight and a functionality of approximately 3.0 (ACCLAIM® 6300 Polyol), in the presence of DABCO® T-12 catalyst at 70° C. for 2 hours to produce the experimental silylated polymer SMP-1.

The experimental silylated polymer SMP-2 was formulated similarly to SMP-1 except that during the coupling step, the ACCLAIM® 6300 Polyol was replaced with VORANOL™ CP6001, a polyol containing chain terminated polyethers, up to 60% by weight which may also function as a plasticizer. The experimental silylated polymer SMP-3 was formulated similarly to SMP-1 except that during the coupling step, the ACCLAIM® 6300 Polyol was replaced with SPECFLEX™ 661, a polyol containing chain terminated polyethers, up to 20% by weight, which may also function as a plasticizer.

Synthesis of Silylated Polymer:

Silylated polymers are formulated as 2-component systems where the A-side includes silylated polymer resin, calcium carbonate filler, water, adhesion promoter and rheology modifier and the B-side includes silylated polymer resin, calcium carbonate filler, moisture scavenger and the curing catalyst.

Component A and B are first mixed individually in a high speed mixer for a minimum of 60 seconds at 2,300 rpm or until a homogeneous mixture is obtained. The two components are then combined and mixed at the same mixing speed for an additional 30 seconds. The mixture is cast using a cylindrical mode to obtain samples with dimensions of 29 (D)×12.5 (H) mm.

Test Methods:

Compression set was measured according to either ASTM D395 or ISO 815-1. A minimum of two test specimens were generated. A 25% compressive load was applied and maintained over a period of twenty-four hours at a temperature of 50 degrees Celsius or 70 degrees Celsius. Sample heights were measured 30 minutes after the compressive load was removed from the samples at a room temperature of 23 degrees Celsius.

Comparative Examples

Table 1 shows the base formulations of an experimental silylated polymer, referred to as SMP, and a commercially available product, referred to as MS® polymer, MS® S303H Polymer. The two formulations contain a Lewis acid, Dibutyltin Diacetylacetonate, as a curing agent which is conventionally used in silylated polymer formulations. It is clear that neither formulation is capable of maintaining its elasticity after prolonged compressive load. The results indicate that the loss of compression set property is also irrelevant of the type of silylated polymer resin used in the formulation. The amount of water contained in the formulation is greater than a 1.0 stoichiometric ratio of water to curable silyl group.

TABLE 1

Formulations containing conventional tin catalyst as a curing agent.

| | Loading (100 pph resin) | |
|---|---|---|
| Component | SMP | MS |
| A-side | | |
| Experimental, SMP-1 | 100 | |
| MS ® S303H | | 100 |
| Imerseal ® 75 | 50 | 50 |
| Distilled Water | 0.57 | 0.57 |
| Cabosil ® TS-720 | 2.5 | 2.5 |
| B-side | | |
| Experimental, SMP-1 | 100 | |
| MS ® S303H | | 100 |
| Imerseal ® 75 | 66.7 | 66.7 |
| DowCorning Z-6040 | 0.5 | 0.5 |
| Silquest ® A-171 | 0.5 | 0.5 |
| Dibutyltin Acetoacetonate | 3.3 | 3.3 |
| Compression set (70° C. 24 hrs) | 99.2% | 101.9% |

Example 1

The Effect of Water

At high level of water content, shown in SMP-high water example, loss of compression set is prominent. By reducing the water content from 2 pph to 0.57 pph in the A-side, the compression set of the experimental product saw substantial reduction in compression set from 103% to 75%, Table 2.

TABLE 2

Formulations varying water content.

| | Loading (100 pph resin) | |
|---|---|---|
| Component | SMP-low water | SMP-high water |
| A-side | | |
| Experimental, SMP-1 | 100 | 100 |
| MS ® S303H | | |
| Imerseal ® 75 | 50 | 40 |
| Distilled Water | 0.57 | 2.0 |
| Cabosil ® TS-720 | 2.5 | 2.1 |
| B-side | | |
| Experimental, SMP-1 | 100 | 100 |
| MS ® S303H | | |
| Imerseal ® 75 | 75 | 85 |
| DowCorning Z-6040 | 0.5 | — |
| Silquest ® A-171 | 0.5 | — |
| Dibutyltin Acetylacetonate | 0.85 | 3.0 |
| Compression set (50° C. 24 hrs) | 75% | 103% |

Example 2

The Effect of Catalyst

The type of catalyst used is shown to impact compression set significantly. By replacing a Tin catalyst (Table 1) with dodecylbenzenesulfonic acid, a Brønsted acid catalyst, compression set was reduced by 50%. The same phenomenon was observed when NACURE® is used, as in Table 4, which is a sulfonic acid.

TABLE 3

Formulation containing a Brønsted acid as a catalyst.

| | Loading (100 pph resin) |
|---|---|
| Component | SMP |
| A-side | |
| Experimental, SMP-1 | 100 |
| MS ® S303H | |
| Imerseal ® 75 | 50 |
| Distilled Water | 0.57 |
| Cabosil ® TS-720 | 2.5 |
| B-side | |
| Experimental, SMP-1 | 100 |
| MS ® S303H | |
| Imerseal ® 75 | 66.7 |
| DowCorning Z-6040 | 0.5 |
| Silquest ® A-171 | 0.5 |
| DodecylBenzylSulfonic Acid | 0.87 |
| Compression set (70° C. 24 hrs) | 48.3% |

TABLE 4

NaCure ® 1051 is used as a curing catalyst.

| | Loading (100 pph resin) | | |
|---|---|---|---|
| Component | SMP | MS | SPUR |
| A-side | | | |
| Experimental, SMP-1 | 100 | | |
| MS ® S303H | | 100 | |
| SPUR+ 1015LM | | | 100 |
| Imerseal ® 75 | 50 | 50 | 50 |
| Distilled Water | 0.57 | 0.57 | 0.57 |
| Cabosil ® TS-720 | 2.5 | 2.5 | 2.5 |
| B-side | | | |
| Experimental, SMP-1 | 100 | | |
| MS ® S303H | | 100 | |
| SPUR+ 1015LM | | | 100 |
| Imerseal ® 75 | 66.7 | 66.7 | 66.7 |
| DowCorning Z-6040 | 0.5 | 0.5 | 0.5 |
| Silquest ® A-171 | 0.5 | 0.5 | 0.5 |
| NaCure ® 1015 | 1.7 | 1.7 | 0.9 |
| Compression set (70° C. 24 hrs) | 27.6% | 25.8% | 11.3% |

Also the use of a non-tin catalyst to improve compression set property is achievable with not only the experimental silylated polymer resins described herein but also commercially available resins. Comparing the compression set property change between MS product formulated with Dibutyltin Diacetylacetonate (Table 1) and non tin catalyst (Table 4), it is clear that the use of a Brønsted acid catalyst is crucial to improve compression set performance.

Table 5 shows an optimized formulation including both a Brønsted acid catalyst and reduced water content having a compression set of −10%.

TABLE 5

A formulation offers compression set similar to a PU prepolymer.

| Component | Loading (100 pph resin) SMP |
|---|---|
| A-side | |
| Experimental, SMP-1 MS ® S303H | 100 |
| Imerseal ® 75 | 50 |
| Distilled Water | 0.57 |
| Cabosil ® TS-720 | 2.5 |
| B-side | |
| Experimental, SMP-1 MS ® S303H | 100 |
| Imerseal ® 75 | 66.7 |
| DowCorning Z-6040 Silquest ® A-171 | 0.5 |
| NaCure ® 1051 | 0.9 |
| Compression set (50° C. 24 hrs) | 10.5% |

Examples

Plasticized Systems

Plasticizers are commonly used in formulations to balance material performance, especially elasticity and hardness. As a result, complete loss of compression set is not uncommon in systems containing plasticizer. In the examples shown in Table 6, the embodiments described herein, are capable of retaining and/or improving compression set property of a plasticized formulation as well. Sample P-1 contains a conventional phthalate material, DINP, whereas in sample P-2 and P-3 the SMP resin contains chain-terminated polyether that by definition is a plasticizer as well. SMP-2 is synthesized using a polyol containing chain-terminated polyethers, up to 40% by weight, such as VORANOL™ CP6001, and SMP-3 is synthesized using a polyol containing chain terminated polyethers, up to 20% by weight, such as SPEC-FLEX™ 661.

TABLE 6:

Formulation containing plasticizer.

| | Loading (100 pph resin) | | |
|---|---|---|---|
| Component | P-1 | P-2 | P-3 |
| A-side | | | |
| Experimental, SMP-1 | 100 | | |
| Experimental, SMP-2 | | 100 | |
| Experimental, SMP-3 | | | 100 |
| DINP plasticizer | 16.5 | | |
| Imerseal ® 75 | 50 | 50 | 50 |
| Distilled Water | 0.57 | 0.57 | 0.57 |
| Cabosil ® TS-720 | 2.5 | 2.5 | 2.5 |
| B-side | | | |
| Experimental, SMP-1 | 100 | | |
| Experimental, SMP-2 | | 100 | |
| Experimental, SMP-3 | | | 100 |
| DINP plasticizer | 16.5 | | |
| Imerseal ® 75 | 66.7 | 66.7 | 66.7 |
| DowCorning Z-6040 Silquest ® A-171 | 0.5 | 0.5 | 0.5 |
| NaCure ® 1051 | 1.6 | 1.6 | 1.6 |
| Compression set (50° C. 24 hrs) | 18% | 24% | 39% |

FIG. 1 is a plot 100 depicting the increase in viscosity of silylated polymers with curing as a function of catalyst loading. Line 110 represents the viscosity of a silylated polymer cured with 0.25 Eq NACURE® 1051 Acid Catalyst. Line 120 represents the viscosity of a silylated polymer cured with 0.15 Eq NACURE® 1051 Acid Catalyst. Line 130 represents the viscosity of a silylated polymer cured with 0.10 Eq NACURE® 1051 Acid Catalyst. The use of catalyst also allows for tuning of reaction kinetics that allows for control over open time and tack free time. FIG. 1 shows the impact of catalyst loading on product viscosity build-up.

While the foregoing is directed to embodiments of the invention, other and further embodiments of the invention may be devised without departing from the basic scope thereof.

What is claimed is:

1. A two component moisture curable system comprising:
a first formulation comprising:
  a silylated polymer of the first formulation;
  water; and
  filler; and
a second formulation comprising:
  a silylated polymer of the second formulation;
  a curing catalyst comprising at least one Brønsted acid; and
  a moisture scavenger, wherein:
the silylated polymer of the first formulation comprises the reaction product of a polyol of the first formulation and an isocyanate capped hydrosilylated polymer of the first formulation, the isocyanate capped hydrosilylated polymer of the first formulation comprising the reaction product of at least one isocyanate of the first formulation and a hydrosilylated polymer of the first formulation, and the hydrosilylated polymer of the first formulation comprising the reaction product of a polymer of the first formulation having at least one unsaturated group and at least one alcoholic group in each molecule and a compound of the first formulation having a hydrogen-silicon bond and a crosslinkable silyl group in each molecule, and
the silylated polymer of the second formution comprises the reaction product of a polyol of the second formulation and an isocyanate capped hydrosilylated polymer of the second formulation, the isocyanate capped hydrosilylated polymer of the second formulation comprising the reaction product of at least one isocyanate of the second formulation and a hydrosilylated polymer of the second formulation, and the hydrosilylated polymer of the second formulation comprising the reaction product of a polymer of the second formulation having at least one unsaturated group and at least one alcoholic group in each molecule and a compound of the second formulation having a hydrogen-silicon bond and a crosslinkable silyl group in each molecule.

2. The two component moisture curable system of claim 1, wherein the curing catalyst has a pKa less than or equal to 2.

3. The two component moisture curable system of claim 1, wherein the curing catalyst has a pKa less than or equal to 1.

4. The two component moisture curable system of claim 1, wherein the silylated polymer of the first formulation includes curable silane and a stoichiometric ratio of water to the curable silane is less than or equal to 2.0.

5. The two component moisture curable system of claim 4, wherein the stoichiometric ratio of water to the curable silane is less than or equal to 1.5.

6. The two component moisture curable system of claim 4, wherein the stoichiometric ratio of water to the curable silane is less than or equal to 1.0.

7. The two component moisture curable system of claim 1, wherein the curing catalyst is selected from the group consisting of: sulfonic acids, carboxylic acid, and phosphoric acid.

8. The two component moisture curable system of claim 1, wherein the curing catalyst is selected from the group consisting of: dodecylbenzylsulfonic acid, dinonylnapthalene disulfonic acid, benzoic acid, and formic acid.

9. The two component moisture curable system of claim 1, further comprising: additives, fillers, dye, plasticizer, thickner, coupling agent, extender, UV stabilizers, and combinations thereof.

10. The two component moisture curable system of claim 1, wherein a final cured product of the first and second formulations has a compression set of less than 100%.

11. The two component moisture curable system of claim 1, wherien a final cured product of the first and second formulations has a compression set of less than 50%.

12. The two component moisture curable system of claim 1, wherein a final cured product of the first and second formulations has a compression set of less than 15%.

13. The two component moisture curable system of claim 1, wherein the silylated polymer of the first formulation is the same as the silylated polymer of the second formulation.

\* \* \* \* \*